Nov. 15, 1938.  M. C. BLONDIN  2,136,486
AUTOMATIC APPARATUS FOR DIRECT OBSERVATION OF PICTURE STRIPS AND THE LIKE
Filed Feb. 14, 1935  4 Sheets-Sheet 1
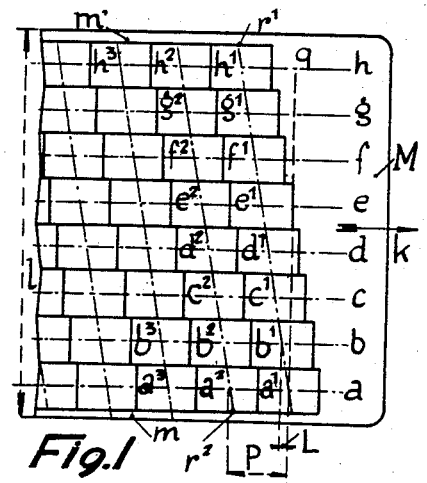
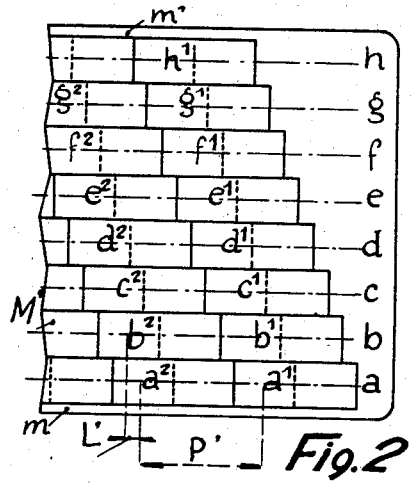
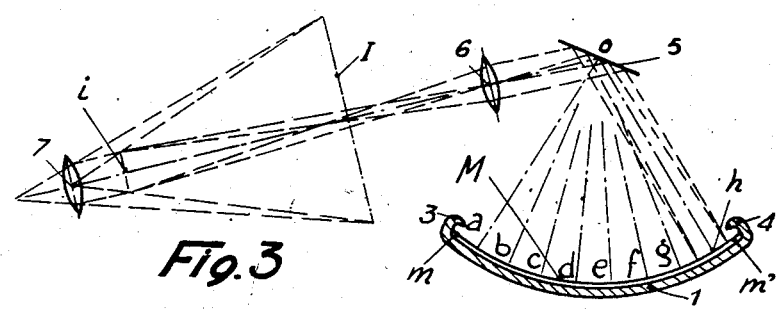
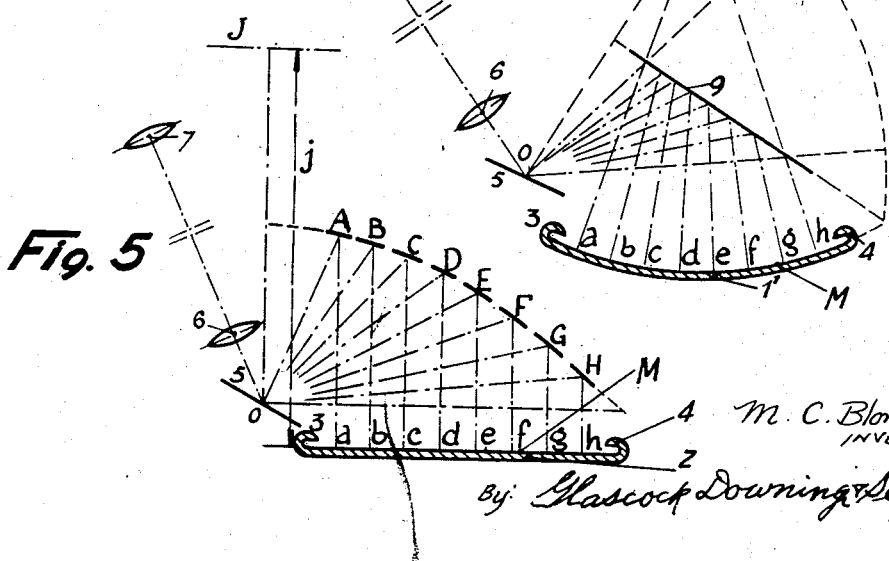

Nov. 15, 1938.　　　　M. C. BLONDIN　　　　2,136,486
AUTOMATIC APPARATUS FOR DIRECT OBSERVATION OF PICTURE STRIPS AND THE LIKE
Filed Feb. 14, 1935　　　4 Sheets-Sheet 2
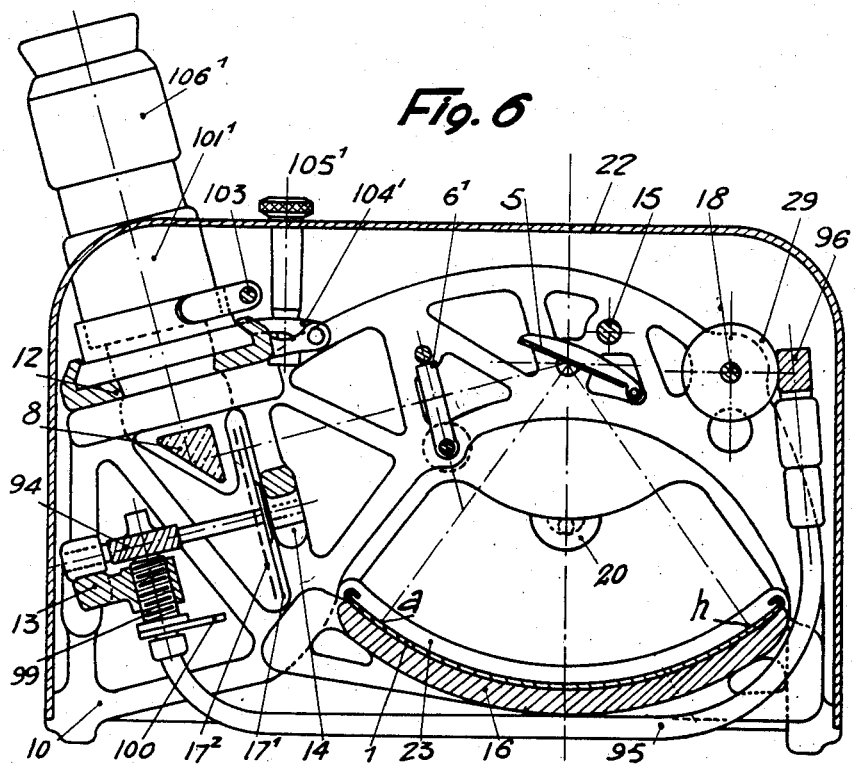
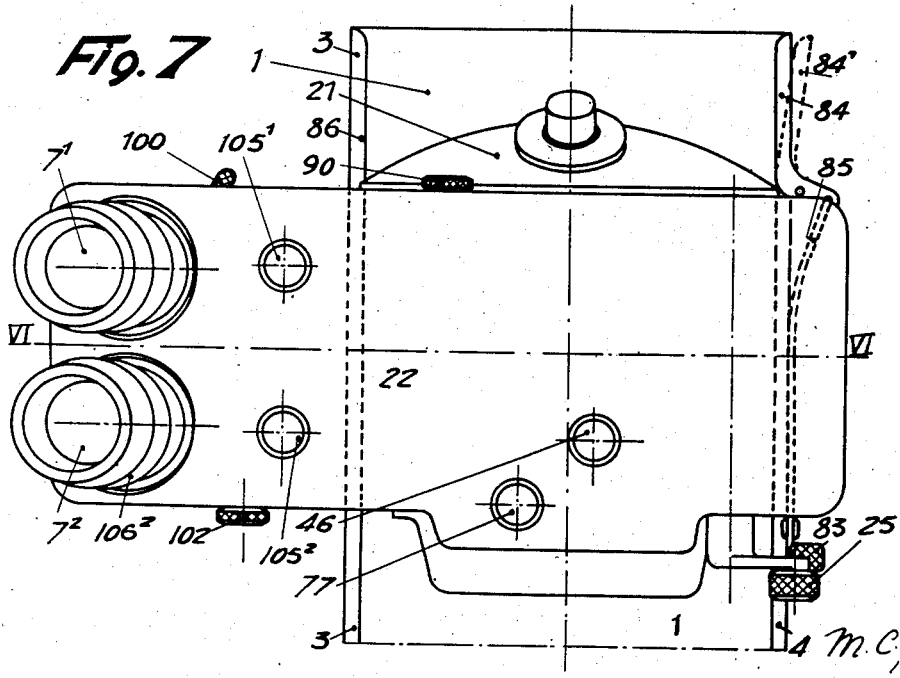

Nov. 15, 1938.   M. C. BLONDIN   2,136,486
AUTOMATIC APPARATUS FOR DIRECT OBSERVATION OF PICTURE STRIPS AND THE LIKE
Filed Feb. 14, 1935   4 Sheets-Sheet 3

M. C. Blondin
INVENTOR

Nov. 15, 1938.                M. C. BLONDIN                    2,136,486
AUTOMATIC APPARATUS FOR DIRECT OBSERVATION OF PICTURE STRIPS AND THE LIKE
                       Filed Feb. 14, 1935          4 Sheets-Sheet 4
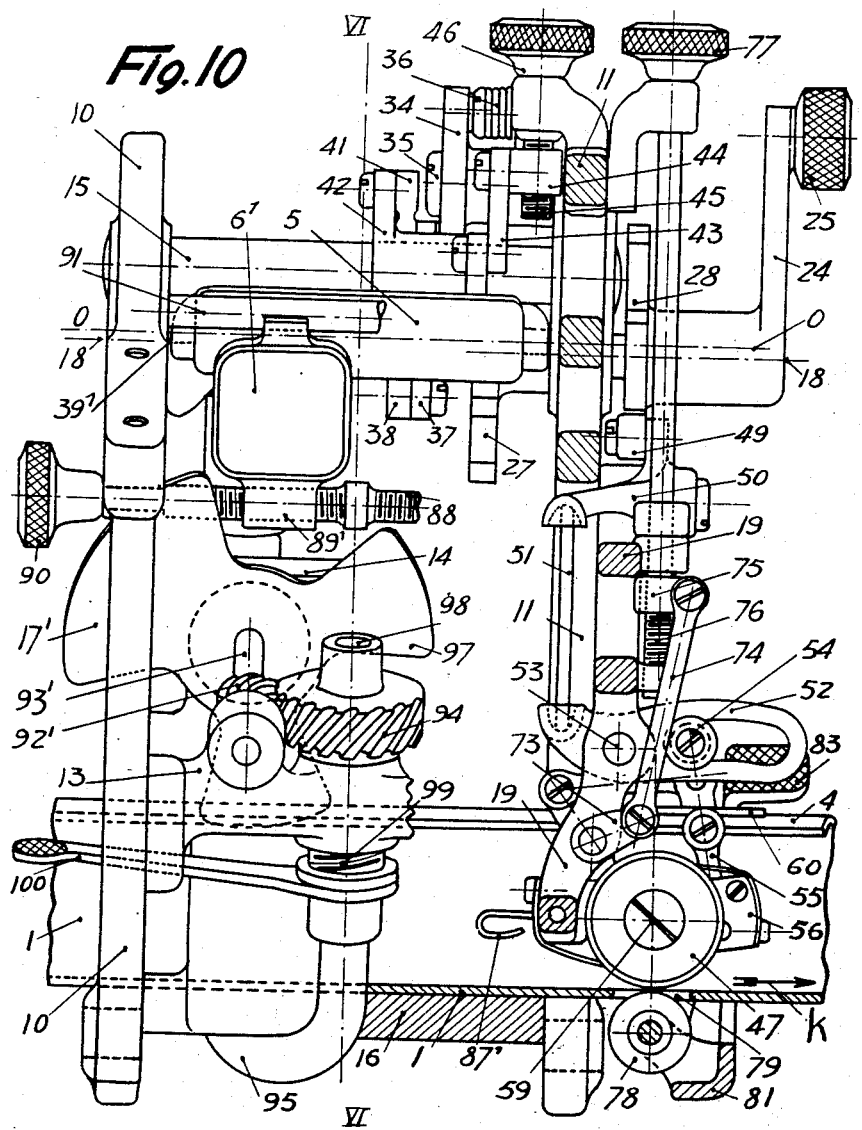
Fig.10
Fig.11
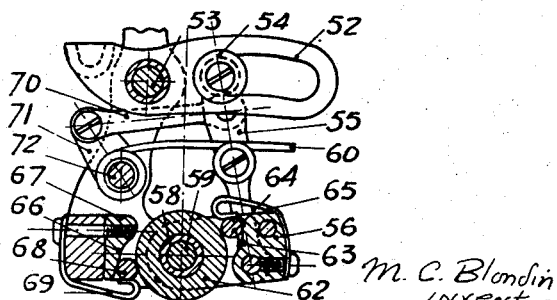

Patented Nov. 15, 1938

2,136,486

UNITED STATES PATENT OFFICE 2,136,486

AUTOMATIC APPARATUS FOR DIRECT OBSERVATION OF PICTURE STRIPS AND THE LIKE

Michel Charles Blondin, Meudon, France

Application February 14, 1935, Serial No. 6,578
In France February 14, 1934

13 Claims. (Cl. 88—1)

Different devices permitting the direct observation of kinematographic pictures are known wherein the pictures succeeding one another at the desired frequency, providing the impression of motion, are seen directly by the observer without any screen projection.

The object of my invention is to provide primarily an improved apparatus for observing pictures recorded for screen projection and subsequently transferred on to large handy strips or sheets preferably of paper adapted to be used in the apparatus. According to the invention, the pictures being arranged on a strip in parallel series perpendicular to the direction of verticality in the pictures, the observation apparatus comprises a slide carrying the strip which is caused to advance step by step in front of a mirror or the like reflecting means, said mirror rotating intermittently round an axis substantially parallel to the direction of progress of the strip under the same control as that which provides the progress of the strip. This allows the successive observation in the mirror of pictures in the successive series, said observation being then begun again in the same order through the next sequence of pictures provided by the successive observation in the successive series, after the mirror has returned into its original starting position.

In appended drawings

Fig. 1 shows a first form of execution of my novel sheet of pictures.

Fig. 2 shows a modification thereof adapted for stereoscopic pictures.

Figs. 3 to 5 show diagrammatically three forms of execution of the apparatus intended for viewing picture sheets of the type shown. Figs. 3 and 4 relate to an apparatus wherein the picture sheets slide longitudinally over a cylindrical support, said pictures being reflected on to a mirror passing through the axis of the cylinder in the case of Fig. 3 and on two successive mirrors the second of which passes through the reflection of said axis by the first mirror in the case of Fig. 4.

Fig. 5 relates to an apparatus wherein the picture sheets slide longitudinally over a plane support.

Figs. 6 to 11 show with more detail an apparatus of the type illustrated in Fig. 3. Fig. 6 is a general cross-section of the apparatus, along the vertical plane of symmetry shown at VI—VI in Fig. 7.

Fig. 7 is a plan view of the whole apparatus. The following Figures 8 to 11 are views and cross-sections on a larger scale of certain portions of the apparatus.

Figure 8:
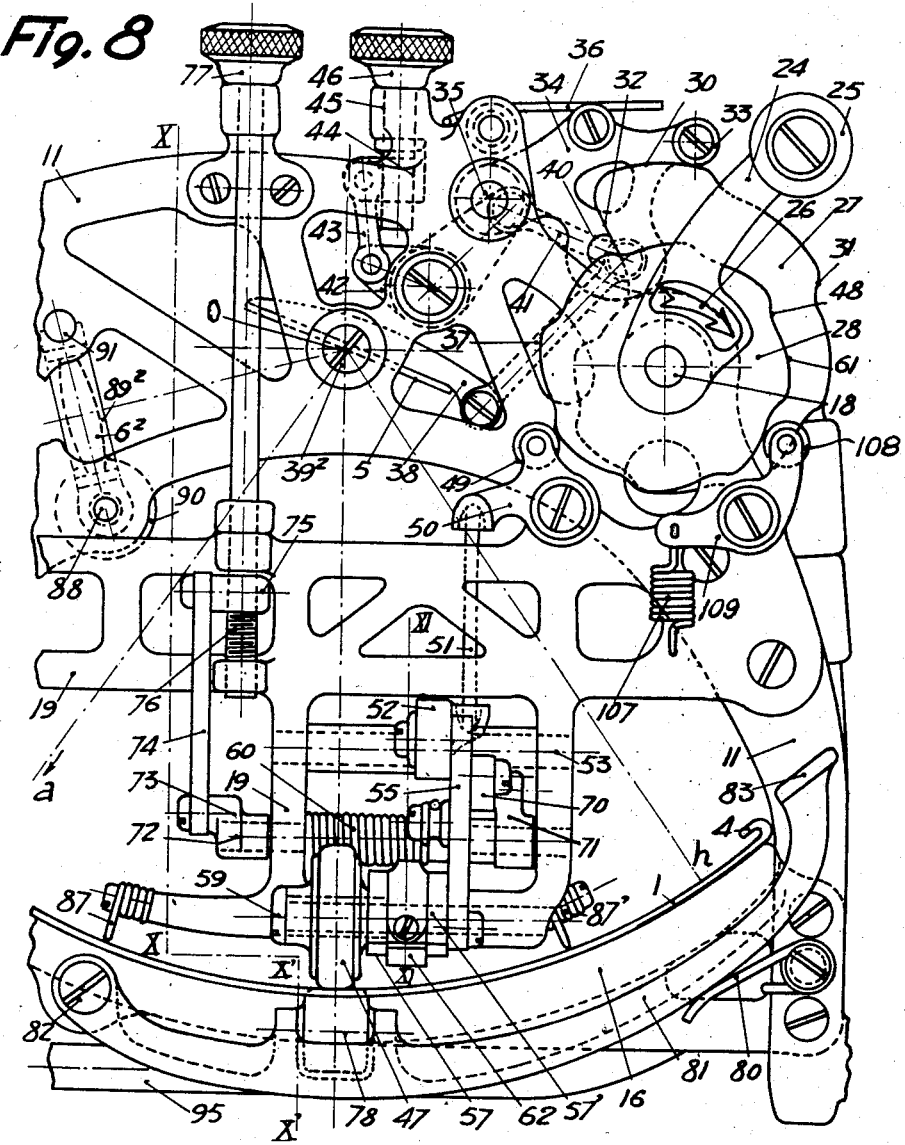

Fig. 8 is a side view of part of the apparatus without its casing.

Figure 9:
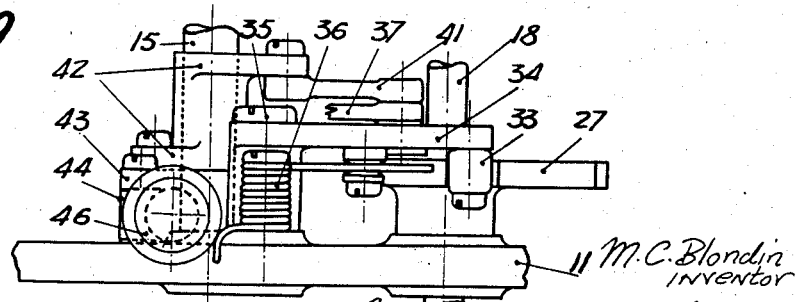

Fig. 9 is a plan view of a detail of the control means of the rocking mirror. Fig. 10 shows on the left hand side of the section line VI—VI passing through the plane of symmetry a fragmentary front view of the apparatus without either the casing, the eyeglass support or the total reflection prism: the right hand side of Fig. 10 is a fragmentary cross section through line X—X—X'—X' of Fig. 8.

Fig. 11 is a detail sectional view through line XI—XI of Fig. 8, showing the driving means for the strip.

The strips or sheets used in the direct observation apparatus comprise a number of series of pictures disposed lengthwise, said series being parallel to the edges of the strip and the pictures being arranged in a manner such that the pictures to be seen in succession are to be taken in succession in the different series from one edge of the strip to the other, i. e., from the first series to the last, this sequence of pictures being begun over again until the different pictures in the different series have been all observed. Fig. 1 shows diagrammatically the beginning of a strip M for ordinary non-stereoscopic observation; this strip comprises between its margins $m$ and $m'$ a suitable number (eight in the case illustrated) of longitudinal series of pictures disposed lengthwise the different series having their longitudinal axes $a$—$b$—$c$—$d$—$e$—$f$—$g$—$h$, passing through the centers of the different pictures of the corresponding series. The pictures belonging to the same series are designated by the same letter as the axis of the series with the indices 1, 2 ... corresponding to the location of the picture in the series.

As the observation proceeds from one series to the next and begins again at the first series when the observer has reached the last, the order of observation is $a_1$—$b_1$—$c_1$—$d_1$—$e_1$—$f_1$—$g_1$—$h_1$—$a_2$—$b_2$—$c_2$—$d_2$—$e_2$—$f_2$—$g_2$—$h_2$—$a_3$—$b_3$—$c_3$. ...

As is apparent from Fig. 1 each picture is shifted longitudinally with reference to the preceding picture lying in the preceding series; this shifting L, measured between perpendiculars to the axes of the different series passing through the centers of the pictures observed in immediate succession (such as $a_1$ and $b_1$), is equal to $$\frac{P}{N}$$

P being the constant distance between the centres of two adjacent pictures such as $a_1$ and $a_2$, of the same series and N being the number of series.

In such a strip M, may be provided free or blank spaces or intervals, not shown, between two adjacent series chiefly for allowing the drive of the strip to be performed without impairing the pictures on the latter.

Now if I draw a straight line between the centers of the pictures to be seen in succession in the different series before returning back to the first series, i. e., between the centers of the pictures having the same indices such as $a_1$, $b_1$ ... $h_1$, $a_2$, $b_2$ ... $h_2$, etc. ..., I obtain a system of straight equally spaced sloping lines parallel to one another. Under such conditions if the margins of the strips are first cut off and the opposite ends of the strip united through an edge to edge connection, I obtain a cylindrical tube formation with an axis parallel to the axes of the different series of pictures on the strip, the different sloping straight lines obtained as just disclosed and the successive ends such as $r_1$ and $r_2$ of which are thus in register one with other will form a single helix having a pitch P along which the pictures seen in succession are regularly distributed in proper sequence.

The arrangement of the strip as a cylindrical tube, which has been disclosed chiefly so as to make the distribution and sequence of the pictures appear more clearly, may moreover receive practical application in particular when it is desired to print pictures from a negative on to the strip; in such a case, the negative constituted by a wide strip of celluloid covered with a photographic emulsion is wound for printing over a cylindrical support adapted to rotate through a succession of angular displacements each corresponding to the spacing between the axes of the different picture series while the film from which the pictures are to be transferred onto the negative is applied against the latter and unwinds picture by picture, at the same time advancing intermittently in a direction parallel to the axis of the cylindrical support through amounts equal to the above mentioned amount of shifting L.

In the case where the moving pictures are also to provide stereoscopic relief, the strip still comprises as shown at M' in Fig. 2 a plurality of longitudinal series; but instead of single pictures each of which is seen in the direct observation apparatus through both eyes of the observer, there are provided here double pictures; each of these double pictures comprises a left and a right picture and is bounded in Fig. 2 by a frame shown in full lines with the line separating the two elementary pictures shown in dotted lines. For greater clearness, the left hand pictures of each double picture are alone indicated by letters with indices as explained with reference to Fig. 1. The elementary pictures seen respectively through the corresponding eye of the observer may be taken for instance from films recorded through two-view taking apparatuses associated in a manner such that their object glasses have a spacing equal to the mean spacing between the eyes. Thus in a given longitudinal series the elementary pictures are in alternation, beginning from the right elementary right hand and left hand pictures; the arrangement remaining otherwise similar to that of Fig. 1, the distance P' between the centres of two elementary pictures of the same nature, i. e. of two left hand pictures or of two right hand pictures (such as $a_1$ and $a_2$ for instance) being double the distance P corresponding to the preceding case of a non-stereoscopic observation. The shifting L' between the images $a_2$ and $b_2$ for instance is similarly equal to double the value of L.

The arrangement of the pictures on large strips such as M or M' and the direct observation of these pictures without projection provide numerous advantages.

In particular, during operation of the apparatus, the strip is driven through successive longitudinal displacements equal to the shifting and, as these displacements are smaller when the number of series increases, the maximum speed of each displacement may become very small. This reduces to a large extent the stresses due to inertia and allows in particular a frictional drive of the strip in which it is unnecessary to provide perforations. I may consequently use for the strips any suitable material even of small resistance and this material need not be transparent; in particular it is of advantage to use strips formed partly or entirely of paper which material is moreover very cheap.

I may also use for the same purpose strips of transparent material such as celluloid, chiefly in the case where the pictures, again observed directly, require illumination through transparency, such for instances as in the case of colored pictures arranged on wide films obtained through any photographic process and used for observation according to my invention.

On the other hand the width of the picture strip allows both its winding over reels and its arrangement as folded material. I may also cut it into a number of different elements which I assemble after the manner of detachable leaves of an album for instance.

In fact a very large number of pictures may be provided on a single leaf of moderate size so that I may distribute all or part of the original film into a suitable number of scenes corresponding each to a leaf, comprising also if desired explanatory notes printed for instance in the margin or at the back. This arrangement of separate leaves easily substituted for one another in the direct observation apparatus allows also the immediate selection among the classified leaves, of the scene which it is desired to look at.

These leaves may be printed, either singly or grouped side by side or according to any other arrangement, on one side or on both sides of paper leaves having the size of papers, reviews, weeklies, albums, books and adapted if required to be inserted or folded inside such publications or to form part thereof. The picture area being bounded on the leaves by two parallel lines spaced by a distance equal to a width $l$ (Fig. 1), it is sufficient to cut them out with scissors or the like along these parallel lines so as to have the leaves or elements ready to pass through the direct observation apparatus.

The pictures may be reproduced on the strips or parts thereof by any suitable means; they may for instance, be printed on light-sensitive paper like ordinary photographs from the original negative or a negative derived therefrom or again through projection on any scale. They may also be reproduced or printed in black or color on paper or other suitable material through any method such as heliogravure inter alia, either from the original film or from the negatives obtained therefrom.

I may also reproduce or print the different pictures twice, once in one color, say, red and once in another, say, green, as in the known case of anaglyphs. Thus the green print may correspond to the original film obtained through the left hand object-glass of the double view-taking apparatus while the red print may correspond to the right hand film. In such a case the direct observation apparatus is provided with two transparent screens, respectively green and red, passing through the corresponding light beams.

I may also, in the case of scenes in which the motion is comparatively slow and which are recorded on an ordinary film moving at standard speed, only transfer on the corresponding elements of the strip one picture out of two for instance. In this case it should be mentioned on these elements that the direct observation apparatus is to move at a given reduced speed. This allows a corresponding increase, say by double, of the time of observation devoted to a given length of strip.

In certain cases I may also arrange at the end of the series of shifted pictures, and in alinement with said series but one underneath the other, a number of supplementary pictures. Thus the moving of the strip from series to series without any lateral shifting of the observed portion may allow the observer looking at the last mentioned pictures to see these in continual succession which succession may form an advertisement for instance. In fact the whole strip may be arranged with such non-shifted pictures, the observation apparatus being then of course controlled in a corresponding manner.

The direct observation apparatus making use of the above described picture strips may be constructed according to several modifications such as those shown in diagrammatic Figs. 3, 4 and 5. These figures illustrate different embodiments in vertical cross-section through the transverse plane of symmetry of the apparatus. Each of these embodiments comprises chiefly a slide or trough in which may be engaged the picture strip M (or M') with the pictures on the outside. This slide is either concave as indicated at 1 in Fig. 3 and at 1' in Fig. 4 or it is straight as indicated at 2 in Fig. 5. This slide secured to the frame of the apparatus is provided with longitudinal flanges 3 and 4 which hold the strip by its margins $m$ and $m'$; the space between these flanges measured along the surface of the slide is therefore equal, with the difference of slight play, to the width $l$ of the strip the accurate positioning of which with reference to the apparatus is provided longitudinally of the slide. In Fig. 3 the band M has been shown, for greater clearness, slightly spaced with reference to the slide 1 while in actual practice it is applied against this slide in contact with the upper surface thereof as shown in Figs. 4 and 5. The pictures are seen in succession by the observer after reflection on a plane mirror 5 (preferably a metal or like mirror having an outer reflecting surface) adapted to rotate through successive angular displacements round an axis of rotation O. This axis of rotation of the mirror is defined by the longitudinal axis of symmetry of its reflecting surface, the pivots or the like which form this axis to either side of the mirror 5 being carried by the frame of the invention.

This axis O is arranged parallel to the guiding flanges 3 and 4 of the slide and consequently to the axes of the longitudinal series of pictures on the strip M supposed lying inside the slide; the axes $a, b, c, \ldots g, h$ of the different series of pictures lie then at equal optic distances from the axis of rotation O of the mirror 5, these distances being measured directly or along the broken path of the visual rays reflected by auxiliary mirrors.

The angular displacements of the mirror 5 are adjusted in a manner such that the visual rays passing through the axis O impinge in succession on the axis of each series of pictures from the first to the last and then return back to the first series and so on; the mirror 5, the general movement of which is a rocking motion, performs thus N—1 angular displacements in a given direction and then a single reverse angular displacement equal to the sum of these N—1 displacements.

The longitudinal displacements of the strip each of which is equal to the shifting L or L' and the angular displacements of the mirror 5 are performed simultaneously; during these movements the duration of which is moreover small with reference to the periods of rest separating them, I may shut off the visual rays by means of a shutter so as to allow observation only during the periods when the mirror and strip are stationary.

Consequently if the mirror 5 is caused to rotate while the strip remains motionless in its slide, the visual ray passing through the axis O of the mirror 5 and falling for instance originally at the center of the image $a_1$ will fall in succession on the axes of the different series at points of the perpendicular $a_1 q$ to these longitudinal axes passing through the center of the picture $a_1$ (Fig. 1); but as in reality the strip is not motionless in the slide and at each angular movement of the mirror 5 is driven in the direction of the arrow $k$ through a distance L, the visual ray originally impinging at the center of the picture $a_1$ will impinge in succession at the center of each of the following pictures $b_1$—$c_1$—$d_1$ . . . shifted one with reference to the other through a distance equal to L. Thus the observer will see the pictures pass by in proper sequence and with a correct centering.

It is to advantage to use for forming the strips, small-sized pictures so as to increase their number, provided, for instance in the case of a reproduction of the strip through a printing method, these pictures remain sufficiently clear. In particular it may be of advantage in practice to select for such pictures the same size as for the usual film pictures, which allows the direct obtention of the negatives adapted for printing the strips from the films or, of course, from films derived fom any film of any particular type.

By reason of the small size of the pictures, the direct observation apparatus may comprise any optic device allowing the observer to see the moving pictures with a sufficient magnification; this device which may be a magnifying glass is preferably constituted by an object-glass and an eye-glass comprising any suitable lens or combination of lenses.

In Figs. 3, 4 and 5 I have shown the object-glass as a lens 6 and the eye-glass as a lens 7. I have shown on these figures the visual ray (lying in their plane) passing through the centers of the lenses 7 and 6 and impinging after reflection against the center of the rocking mirror 5 on the axes $a, b, c \ldots h$ of the different series of pictures in succession.

This arrangement of a single object-glass and eye-glass corresponds to observation through one eye and may be utilized in the case of apparatuses of cheap construction. Of course it is preferable to provide the apparatus with a double eye-glass and object-glass arranged symmetrically to either side of the transverse plane of symmetry i. e. to the left and right thereof. This allows a binocular observation either stereoscopic or nonstereoscopic.

In the diagram shown in Fig. 3 the slide 1 forms part of a cylinder the axis of which coincides with the axis of rotation O of the rocking mirror 5; the object-glass produces a real image $i$ of a picture of a series of the strip M, said image being seen by the observer as a magnified virtual image I through the eye-glass 7.

It may be of advantage for different reasons (such as the reversing of the images forming magnifications of the pictures on the strip, the reduction in size, the improvement of the position of the observer with reference to the apparatus) to cut off the visual rays with one or more auxiliary lenses, or else to cause their reflection on one or more mirrors or total reflection prisms, arranged and directed in any suitable manner.

Fig. 4 shows a modification where the reflecting mirror 9 is arranged between the rocking mirror 5 and the picture strip M which allows the mirror 5 to be brought nearer the cylindrical slide 1' similar to the cylindrical slide 1 of Fig. 1. This provides a steadier and more rigid structure or else a slide or trough having a larger radius of curvature. The reflecting mirror 9 rigid with the frame of the apparatus and parallel to the axis of rotation of the rocking mirror 5 is arranged in a manner such that if an image slide $1^2$ having the same radius as the real slide 1' is considered, the axis of the cylinder constituting it coincides with the axis O of the mirror 5, this image slide $1^2$ being symmetrical to the real slide 1' having O' as an axis with reference to the reflecting surface of the mirror 9. Otherwise stated the image O' of O in the reflecting mirror 9 is on the axis of the cylindrical slide 1'. Consequently the observer sees the pictures on 1' as if they were arranged on the image slide $1^2$ symmetrically with reference the mirror 9 and in a manner similar to what has been described with reference to the modification of Fig. 3.

Fig. 5 shows another modification in which the single reflecting mirror of the preceding example is replaced by a number of small plane mirrors ABCDEFGH secured to the frame and arranged side by side; these mirrors are parallel to the axis of rotation O of the rocking mirror 5 and their number is equal to that of the series of pictures on strip M, each mirror being intended for the exclusive reflection of the corresponding series. The mirrors AB . . . . H are not arranged in the same plane, which would be equivalent to the arrangement of Fig. 4, but in planes having gradually increasing slopes. Thus the visual rays which are to impinge on the axes of the series of pictures after reflection on the axis O of the mirror 5 and on the longitudinal axis of symmetry of the corresponding mirror AB . . . H, lie after the latter reflection in planes parallel to one another and the section of which through the plane of Fig. 5 is shown by the parallel lines $Aa$, $Bb$, $Cc$ . . . $Hh$. Consequently the cross-section of the slide 2 is rectilinear and lies perpendicularly to these parallel lines $Aa$, $Bb$, $Cc$ . . . $Hh$ instead of forming an arcuate line as in the preceding cases.

In other words, the centers of the plane reflecting mirrors ABC . . . H are arranged in the plane of Fig. 5 along the arc of a parabola the focus of which coincides with the center O of the rocking mirror 5 and the directing line J of which is parallel to the slide 2 and lies at a distance $j$ of the strip M in the slide, which is equal to the length $Aa$, $Bb$ . . . of the visual rays between the axis and the strip M. Obviously these visual rays are equal to one another in length and are thus equal to the distance between the axis of any sloping mirror and the slide plus the distance of the said axis to the axis O which is of course equal to the distance of the former axis to the directing line.

The modification which has been described comprising a flat slide shows special advantages especially when the strip is somewhat stiff and cannot be used easily in a concave slide; moreover, such a plane slide may offer greater facility for the introduction of separate leaves when the strip is divided into several leaves; lastly the strip thus used, without any curvature being applied to it as it passes through the direct observation apparatus, may be more easily, after this passage, wound over magazine reels or folded after the manner of a folder.

I have shown by way of example in Figs. 6, 7, 8, 9, 10 and 11 a direct observation apparatus of the type shown in Fig. 3. This embodiment allows binocular observation, either stereoscopic or non-stereoscopic, by using picture strips M or M' of the type illustrated in Fig. 1 or Fig. 2. The chief features of this embodiment are easily applicable to other modifications of the apparatus.

In the form of execution illustrated the frame is constituted in practice by two transverse rigid bridge-shaped uprights 10—11 (Fig. 10) connected through suitable stays 12—13—14—15 (Fig. 6). This frame carries at its lower part an auxiliary frame 16 supporting a cylindrically shaped grooved part or picture slide 1 which may of course be removable; between the uprights 10 and 11 are arranged the rocking mirror 5 (the axis O of which coincides with the geometrical axis of the cylindrical slide 1), the object-glasses 6' and $6^2$, the shutters 17' $17^2$ and the total reflection prism 8. At their upper part, the uprights carry on one hand the stay 12 mentioned hereinabove carrying itself the holders 106'—$106^2$ for the eye-glasses 7' and $7^2$ (Fig. 7) and on the other hand the rotatable control shaft 18. To one of the uprights 11 is secured a cross-beam 19 (Fig. 8) the lower part of which passes over the slide 1, said beam 19 carrying the strip driving means. The other upright 10 carries a lamp 20 which a suitable reflector 21 for illuminating the strip.

The whole of the frame and its fittings is enclosed in a box or casing 22 adapted to be dismantled and the side faces of which are provided with apertures such as 23 through which the slide 1 is adapted to pass and through which the picture strips may enter and pass out of the apparatus. The shaft 18, may rotate under the action of the crank 24 controlled by the milled knob 25 or of any suitable motor in the direction of the arrow 26 (Fig. 8). To said shaft 18 is rigidly secured a cam 27 controlling the angular displacements of the mirror 5, a cam 28 controlling the longitudinal movement of the picture strip and the pinion 29 controlling the rotary shutters 17' and $17^2$.

The cam 27 has its outline subdivided into a number N of sections corresponding to the number of picture series forming the picture strip used. These sections form circular parts or rests such as 30 coaxial with the shaft 18 and the radii of which increase from one section to the next. These sections, the number of which is eight in the case illustrated, are connected through short sloping portions such as shown at 31, the last section of largest radius being directly connected with the first section of smallest radius through the substantially radial bearing surface 32.

The cam 27 controls, through the agency of the roller 33, the successive lifts of the lever 34 adapted to pivot round the axis 35 and urged back by the spring 36. This lever 34 drives through the connecting rod 37 the lever 38 rigidly secured to the mirror 5 adapted to rock with said lever 38 around the pivots $39^1$, $39^2$ carried by the uprights 10—11.

In order to provide when required a large accuracy of adjustment for the angular displacements of the mirror 5, the connecting rod 37 may be slightly displaced when desired with reference to the slot 40 provided in the lever 34 under the action of the rod 41, controlled by the lever 42. The latter adapted to rock around the cylindrical stay 15 is connected through the small rod 43 with a nut 44; this nut 44 is screwed over the bolt 45 rigid with the milled knob 46 controlling this adjustment of the movements of the mirror 5 through the rod 37. In a simplified construction, the connecting rod 37 may be directly connected with the lever 34 without a slot such as 40; the cam 27 may also be caused to engage directly the lever 38 provided, for instance, with a roller similar to 33.

When the crank 24 is actuated in the direction shown by the arrow 26, the rest sections of increasing radii on the outline of the cam 27 come in succession under the roller 33; the mirror 5 which is stationary as long as the roller 33 remains on the same rest section moves through a certain angle each time the roller engages one of the sloping portions 31 whereby it is brought on to a following rest.

In Fig. 8, the cam 27 is shown with its rest section of largest radius 30 underneath the roller 33; the visual rays reflected by the prism 8 impinge, after reflection against the axis O of the mirror 5, on the axis $h$ of the last series of pictures; it is apparent that when the cam rotates, the roller 33 after passing over the rest section 30 follows under the action of the spring 36 the substantially radial portion 32 and arrives on the rest section of smallest radius whereby the mirror is set back through the direction opposed to its prior angular displacements into its original position for which it returns the visual rays reflected by it on to the first series of pictures having $a$ as an axis.

The radii of the rest sections may be chosen in a manner such that the series of pictures are equidistant. It is preferable to provide moreover between these series, by suitably choosing the radii of the rest sections on the cam 27, one or more intermediary spaces or narrow blank intervals along which the picture strip may be frictionally driven by the roller 47 without any tarnishing of the pictures through the latter.

The cam 28 controlling the longitudinal displacement of the strip is a circular disc concentric with the axis 18 and provided at its periphery with a plurality of regularly distributed similar slopes 48 connected through counterslopes 61, the number of which is equal to the number of picture series on the strip used, eight in the case considered; the rising slopes 48 on the cam produce, through the agency of the roller 49 carried by the lever 50 controlling in its turn the push-bar 51, the successive lifts of the slide 52 rotatably on the shaft 53 carried by the crossbeam 19. This slide 52 provides through the roller 54 engaging it and through the connecting rod 55, the lift of part 56; the flanges 57, 57' of said part 56 are adapted to rock round the socket 58 which latter may rotate round the axis 59 carried by the cross beam 19 (see Figs. 8, 10 and 11).

A return spring 60 acting on the connecting rod 55 ensures through the agency of parts 54, 52, 51, 50 the permanent contact between the roller 49 and the cam 28 and causes part 56 to lower each time roller 49 bears against the receding counterslopes 61 on the cam 28. The socket 58 is rigidly secured to or integral with the picture strip driving roller 47 on one hand and a small drum 62 on the other hand. This drum 62 is arranged between the flanges 57—57' of part 56 which latter is formed with an inwardly cut incurved slope 63 slightly eccentric with reference to the outer cylindrical surface of the drum 62 (Fig. 4); a small roller 64 is arranged between the drum 62 and the slope 63 and is urged against both said parts by the spring 65.

A slope 66 similar to the slope 63 is provided on a part 67 integral with the cross-beam 19 and a roller 68 urged by a spring 69 is engaged between the drum 62 and the slope 66. The arrangement of the slopes 63 and 66 is such that when the connecting rod 55 controls the lift of the part 56, the roller 64 is jammed between the slope 63 and the drum 62, which produces a rotary motion of the latter and consequently of the roller 47 whereas the roller 68 has a tendency during the rotation of the drum 62 to disengage the latter and the slope 66 so as not to oppose said rotation. Reversely, when the spring 60 causes the part 56 to lower, the roller 64 has a tendency to move away from the drum 62 and the slope 63; the part 56 sinks without any drive being exerted on the drum 62 which is moreover locked against any rotation corresponding to this sinking motion of part 56 through the wedging of the roller 68 between the drum 62 and the slope 66.

The result of the arrangement is that the picture strip is stationary during the sinking motion of part 56 whereas when the latter rises, the picture strip is subjected through the roller 47 to a predetermined advance motion in the direction of the arrow K.

The magnitude of each advance motion of the picture strip depends in particular on the position of the roller 54 in the slide 52. This position is determined by the rod 70 secured on one hand to the connecting rod 55 carrying the roller 54 and on the other to the crank 71 integral with the spindle 72 carried by the cross-beam 19; this spindle 72 is controlled by the crank 73, the rod 74 and the nut 75 moving over the bolt 76 when the latter is caused to rotate under the action of the milled knob 77. This allows a very accurate adjustment of the elementary displacement of the picture strips which may thus be made exactly equal to the shifting L corresponding to non-stereoscopic observation or to the shifting L' corresponding to stereoscopic observation.

The driving through the roller 47 of the picture strip arranged in the slide 1 is ensured by the pressure of a roller 78 which engages an aperture 79 provided in the slide 1 opposite the roller 47 and is adapted to urge the strip against the latter under the action of a spring 80 (Fig.

8) urging upwards the lever 81 carrying the roller 78; in order to make the drive easier, the roller 47 may be coated with rubber or any other material having a high coefficient of friction.

The lever 81, pivotally secured at 82 to the cradle 16, is provided with a part 83, the depression of which causes the lowering of the roller 78 and allows the picture strip in the slide to move freely between the rollers 78 and 47. In order to further the introduction of the strip between the flanges of the slide 1, I may in particular provide a hinge on the forward end 84 of one of the flanges 4 of the slide (Fig. 7) whereby said end may be slightly spaced with reference to the slide and enter the position 84'. This opening or spacing may be controlled for instance through a yielding connection 85 such as a small cable inside a sheath or the like urged by a spring such as 80, said connection connecting the end 84 of the flange 4 with part 83; moreover in order to provide immediately the correct positioning of the strip with reference to the mirror 5, the angular position of crank 24 on the shaft 18 is suitably chosen with reference to that of cam 27 in order that said crank 24 may be stopped in a predetermined angular position thereof, that for instance for which the milled knob 25 is at the lower end of its path. This allows the same hand to be used for depressing the part 83 and for actuating the milled knob 25 during operation; the other hand is then used for pushing the strip previously introduced into the slide until a mark provided on one edge of the strip registers with a notch or index 86 carried by the corresponding edge 3 of the slide 1; moreover small springs such as 87, 87' may be secured to the lower surface of the cross-beam 19 so as to slightly bear against the picture strip, preferably against the blank intervals between two series so as to urge the strip against the slide.

The two object-glasses $6^1$ and $6^2$ (the left-hand object-glass $6^1$ is shown on Figures 6 and 10) are symmetrically arranged with reference to the vertical plane of symmetry of the apparatus and are mounted on the frame through the agency of a common threaded spindle 88 carried by the uprights 10 and 11 and threadedly engaging the corresponding object-glass holders $89^1$ and $89^2$; the threads engaging the two object-glasses have equal and opposite pitches. Consequently by acting on the milled knob 90 controlling the threaded spindle 88, the two object-glasses are moved towards or away from one another, said object-glasses being moreover held and guided along the rod 91 parallel to the spindle 88. This arrangement has chiefly for its object means for allowing an accurate setting of the object-glasses, either for stereoscopic or for non-stereoscopic observation. The apparatus may be provided with a shutter system arranged preferably near the zone where the beams of visual rays show their greatest constriction, said shutter system being adapted to cut these beams off during the periods when the rocking mirror 5 shifts them from one picture (single or double) to the next.

I have shown by way of example an arrangement comprising two rotary shutters $17^1$ and $17^2$ symmetrically arranged with reference to the plane of symmetry of the apparatus; however as the circles swept by the shutters cut one another I space them slightly one with reference to the other so as to allow their rotation. Fig. 6 whereby in the shutter $17^2$ has been conventionally shown in dotted lines makes this spacing appear clearly. The simultaneous rotation in reverse directions at the frequency of one revolution per picture observed of the two shutters may be controlled for instance by means of worms or pinions with inclined teeth $92^1$ and $92^2$ keyed respectively to the spindles $93^1$ and $93^2$ of the corresponding shutters and meshing with the toothed wheel 94 arranged between said worms or pinions. The system $17^1$, $93^1$ and $92^1$ is illustrated in Fig. 10. The wheel 94 is connected through its spindle 98 with a flexible shaft 95 rotating in a sheath and ending with a worm or pinion 96 engaging the toothed wheel 29 (Fig. 6). The rotary shutters of any suitable type comprise, for instance, a shutter proper 17' and auxiliary elements 97 adapted to reduce scintillation.

There is provided, for the passage from non-stereoscopic observation to stereoscopic observation, an arrangement which produces the exact conformity of the adjustment of the two shutters with the corresponding modification in the relative spacing of the two beams of visual rays; to this end the spindle 98 carrying the wheel 94, which is perpendicular to the plane of the shutter axes $93^1$ and $93^2$, is rotatably mounted in the socket 99 provided with a control lever 100 and having an external thread adapted to be screwed into the stay 13. It is thus possible by acting on the lever 100 to slightly displace the wheel 94 axially of its spindle 98 between the pinions $92^1$ and $92^2$ and to make the latter rotate symmetrically through the angle required for the desired adjustment, without any corresponding rotation of the wheel 94 round its axis.

The carriers $101^1$ and $101^2$ for the two eye-glasses $7^1$ and $7^2$ are supported at their lower end by the stay 12 provided preferably with a longitudinal slide in which the eye-glass holders may move. This movement is provided chiefly for the adjustment required by the spacing of the observer's eyes under the control of the milled knob 102 integral with the spindle 103 having threads of equal and opposed pitches, as in the case of the adjusting means provided for object-glasses; the eye-glass carriers may each be locked in the slide of the stay 12, by means of jaws such as $104^1$ adapted to be tightened through the milled knobs $105^1$ and $105^2$. At their upper end the eye-glass carriers, which may be capable of being dismantled or telescopically collapsed, may be provided with devices, such as the threaded sockets $106^1$ and $106^2$ similar to the fittings used in opera-glasses, which allow the focusing of the eye-glasses.

The apparatus may also be provided with a fly-wheel keyed to the shaft 18 or to a shaft driven by the latter at greater speed; moreover for reducing the small jerks due to the simultaneous operation of the rising slopes on cams 27 and 28, I provide a roller 108 bearing against the cam 28 under the action of a suitably adjusted compensating spring 107, said roller 108 being carried by the lever 109 (Fig. 8) and adapted to move over the inwardly receding slopes of the cam 28 while the rising slopes are pushing the roller 49. For greater regularity of motion, the roller 108 instead of acting on the cam 28 may bear against a special cam preferably keyed to the same shaft 18 and the outline of which takes into account the successive increases of the pressure of the spring 36 and its sudden release in order to compensate for such variations in pressure.

In order to prevent any actuation of the crank 24 in a direction opposed to that illustrated by the arrow 26 which corresponds to operation of the apparatus, I may arrange between the shaft 18 and one of the uprights 10 a wedging device similar to that described with reference to the driving means for the picture strip, which device prevents the reverse rotation of the roller 47 through the agency of the drum 62, slope 66, roller 68 and spring 69.

Obviously the forms of execution of the direct observation apparatus and the picture strips used therein may be widely varied in their arrangements as well as in their details concerning the shape, nature, number and relative position of the parts constituting them. In particular, the different arrangements disclosed by way of example in the above description of a direct observation apparatus, and which ensure the working of the apparatus according to my invention, may be modified inter alia in the following manners.

The variable control for the advance of the picture strip in its slide constituted by the slide 52 and the wedged drum 62 may be replaced by any known plate and friction wheel system providing a variable speed of advance. The plate may receive, for instance through the agency of a catch mounted on a rocking lever and acting on a ratchet wheel, a succession of impulses provided through the action of the projections on a cam similar to cam 28, which impulses are transmitted by the friction wheel, after amplification or reduction according to the position of the friction wheel on the plate, to the strip-controlling roller. The cams 27 and 28 may be of any suitable type and their shape may be that of a plate or of a cylinder with grooves or slots providing without the use of any springs the movements of the spigots travelling therein.

The shutter system may be constituted by one or more rocking screens arranged for instance between the uprights 10 and 11, and controlled directly or through a leverage system of any kind by a cam keyed to the shaft 18. The apparatus may moreover work satisfactorily without any shutter, by reason chiefly of the small inertia of the mirror and parts rocking therewith, which provides a very speedly passage from one picture to the next.

The illumination of the picture strip may be performed through any lamps or lamp systems distributed in any suitable manner; if required auxiliary illumination means may be arranged underneath the slide 1 and inside the cradle 16, the slide and cradle being in such a case hollowed out and perforated therefor so as to allow the observation of pictures, say of color pictures on celluloid strips illuminated through transparency. The illumination may moreover be executed through any source of natural or artificial light independent of the apparatus and acting either directly or through reflectors, stationary or adjustable.

What I claim is:

1. An apparatus for direct observation of picture strips the pictures of which are arranged in parallel series perpendicular to the direction of verticality in the pictures, said apparatus comprising a slide adapted to carry the picture strip and to allow its progression therein parallel to the axes of the picture series, means for intermittently progressing the picture strip, reflecting means arranged in front of the slide and adapted to rock round an axis lying in its own plane and parallel to the direction of progress of the strip, means for making the reflecting means advance intermittently through predetermined angles round its rocking axis between predetermined limits and return periodically to a given angular position, means controlling simultaneously said last-mentioned means and the means providing the progression of the strip and means for observing through the reflecting means the pictures reflected thereby.

2. An apparatus for direct observation of picture strips the pictures of which are arranged in parallel series perpendicular to the direction of verticality in the pictures with a transverse shifting thereof from one series to the next, said apparatus comprising a slide adapted to carry the picture strip and to allow its progression therein parallel to the axes of the picture series, means for providing said progression stepwise through values equal to said shifting plane, reflecting means arranged in front of the slide and adapted to rock round an axis lying in its own plane and parallel to the direction of progress of the strip, means for making the reflecting means advance intermittently through predetermined angles round its rocking axis between predetermined limits and return periodically to a given angular position, means controlling simultaneously said last-mentioned means and the means providing the progression of the strip and means for observing through the reflecting means the pictures reflected thereby.

3. An apparatus for direct observation of picture strips the pictures of which are arranged in parallel series perpendicular to the direction of verticality in the pictures, said apparatus comprising a flat slide adapted to slidingly carry the picture strip, means adapted to make the strip progress stepwise in the slide in parallelism with the axes of the picture series, a pivot parallel to the position of said axes, a reflecting surface adapted to rock round said pivot, a plurality of reflecting means adapted to reflect the light rays perpendicular to the picture surface of the corresponding series on to said rockable reflecting surface, means for observing the pictures thus reflected, means for making the rockable reflecting surfaces reflect in succession into the last mentioned means the pictures reflected by the different reflecting means from the first to the last in the order of the corresponding series, said succession being begun over again when it is at an end and means controlling simultaneously said last-mentioned means and the means providing the progression of the strip.

4. An apparatus for direct observation of picture strips the pictures of which are arranged in parallel series perpendicular to the direction of verticality in the pictures, said apparatus comprising a part cylindrical slide adapted to slidingly carry the picture strip, means adapted to make the strip progress stepwise in the slide in parallelism with the axes of the picture series, a pivot parallel to the direction of said axes, a reflecting surface adapted to rock round said pivot adapted to receive the picture rays directed radially of the slide, means for observing the picture thus reflected, means for making the rockable reflecting surface reflect in succession into the last-mentioned means the pictures from the successive series from the first to the last and begin over again this successive reflection when a picture from the last series has been observed through the observation means and means controlling simultaneously said last-mentioned means and the means providing the progression of the strip.

5. An apparatus for direct observation of picture strips the pictures of which are arranged in parallel series perpendicular to the direction of verticality in the pictures with a transverse shifting thereof from one series to the next which is equal to the uniform spacing of the pictures in each series, divided by the number of series, said apparatus comprising a part cylindrical slide adapted to slidingly carry the picture strip with the series directed parallel to its generatrices means adapted to make the strip progress stepwise in the slide axially of the series through amounts equal to the shifting of the pictures from one series to the next, a pivot lying axially of the slide, a mirror parallel to said pivot adapted to rock round same, an optic observation system adapted to receive the picture rays reflected by the mirror, and means adapted to act at each longitudinal progress of the strip for making the mirror assume in succession the angular positions corresponding to the reflection into the observation system of pictures in the successive series, said succession of angular positions being begun over again when it is at an end.

6. An apparatus for direct observation of picture strips the pictures of which are arranged in parallel series perpendicular to the direction of verticality in the pictures with a transverse shifting thereof from one series to the next which is equal to the uniform spacing of the pictures in each series divided by the number of series, said apparatus comprising a part cylindrical slide adapted to slidingly carry the picture strip with the series directed parallel to its generatrices, a pivot lying axially of the slide, a mirror parallel to said pivot adapted to rock round same, an optic observation system adapted to receive the picture rays reflected by the mirror, a rotatable shaft parallel to the axis of the slide, control means therefor, a cam keyed thereto for making the strip progress stepwise in the slide axially of the series through amounts equal to the shifting of the pictures from one series to the next and a second cam keyed to the shaft controlling the angular position of the mirror for moving the latter each time the strip progresses longitudinally and making it reflect successively into the observation system pictures from the successive series, said succession of angular positions being begun over again when it is at an end.

7. In an apparatus as claimed in claim 6 a shutter and a cam keyed to the rotary shaft for making said shutter cut off the picture beam at each longitudinal progress of the strip and simultaneous rocking of the mirror.

8. In an apparatus as claimed in claim 6 the provision of a series of circular sections on the periphery of the second cam and number of which is equal to that of the series of pictures, and slopes connecting the successive sections together and providing a connection between the last and first section, a roller cooperating therewith, mechanical means adjustably connecting the roller with the mirror for giving it a predetermined position according to the section against which the roller bears and means yieldingly acting on last mentioned means for holding the roller against the cam periphery.

9. In an apparatus as claimed in claim 6 the provision of a friction roller adapted to be brought into contact with the picture strip in the slide, a plurality of equally distributed equal projections on the first cam, a cam follower cooperating therewith and means whereby each rise of the cam follower controls the rotation of the friction roller for making same frictionally produce the advance of the strip through an amount equal to the shifting of the pictures from one series to the next.

10. In an apparatus as claimed in claim 6 the provision of a friction roller adapted to be brought into contact with the picture strip in the slide, a plurality of equally distributed equal projections on the first cam, a cam follower cooperating therewith and means whereby each rise of the cam follower controls the rotation of the friction roller for making same frictionally produce the advance of the strip through an amount equal to the shifting of the pictures from one series to the next, said last mentioned means including a wedge roller clutch, which is operative for one radial direction of movement of the cam follower and is inoperative for its reverse operation.

11. In an apparatus as claimed in claim 6 the provision of a friction roller, an auxiliary roller adapted to bring the friction roller into contact with the picture strip in the slide, means controlling the position of said auxiliary roller, a plurality of equally distributed equal projections on the first cam, a cam follower cooperating therewith and means whereby each rise of the cam follower controls the rotation of the friction roller for making same frictionally produce the advance of the strip through an amount equal to the shifting of the pictures from one series to the next.

12. In an apparatus as claimed in claim 6, the provision in the observation system of a total reflection prism, two adjustable object-glasses and two adjustable eye-glasses receiving the rays reflected by the mirror and total reflection prism through the corresponding object-glasses.

13. An automatic apparatus for direct observation of picture strips and the like the pictures of which are arranged in parallel series perpendicular to the direction of verticality in the pictures with longitudinal spaces between the series, said apparatus comprising a slide adapted to carry the picture strip and to allow its progression therein parallel to the axes of the picture series, a friction wheel adapted to be located over the longitudinal spaces of the strips and to intermittently progress said strip, plane reflecting means adapted to rock around an axis lying in its own plane and parallel to the direction of progress of the strip, means for making the reflecting means advance intermittently through predetermined angles around its rocking axis between predetermined limits and return periodically to a given angular position, means controlling simultaneously said last-mentioned means and the friction wheel and means for observing through the reflecting means the pictures reflected thereby.

MICHEL CHARLES BLONDIN.